Sept. 16, 1969  G. PARKER  3,466,920
EXPANDING TOOL FOR USE WITH A TUBULAR WORKPIECE
Filed May 18, 1967  2 Sheets-Sheet 1
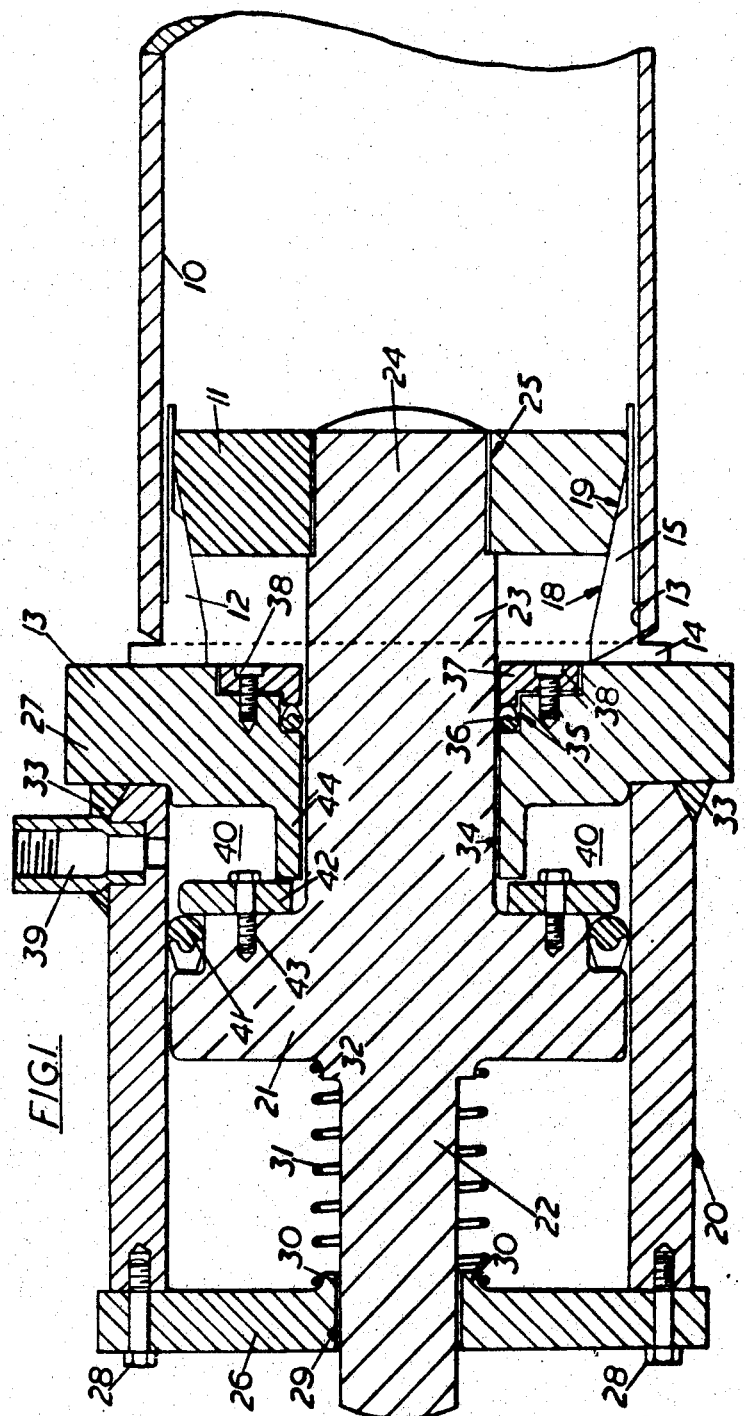
Inventor
George Parker
By
Stevens, Davis, Miller & Mosher Attorneys

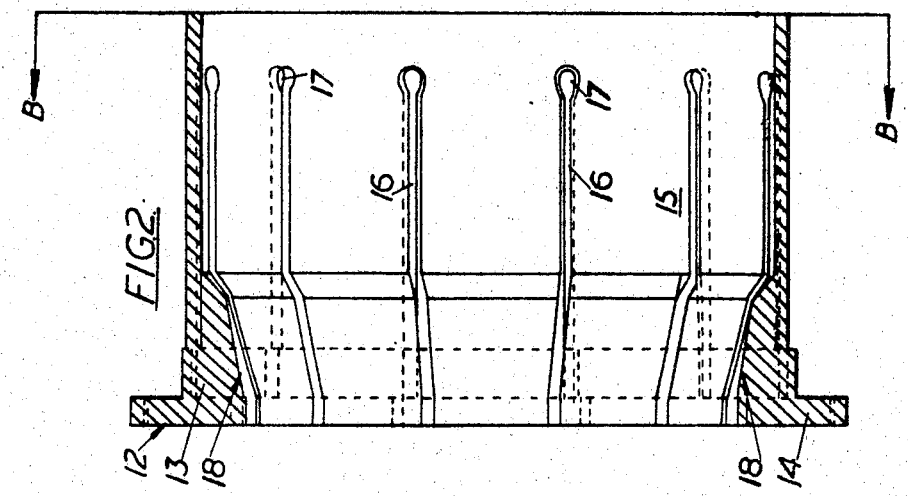
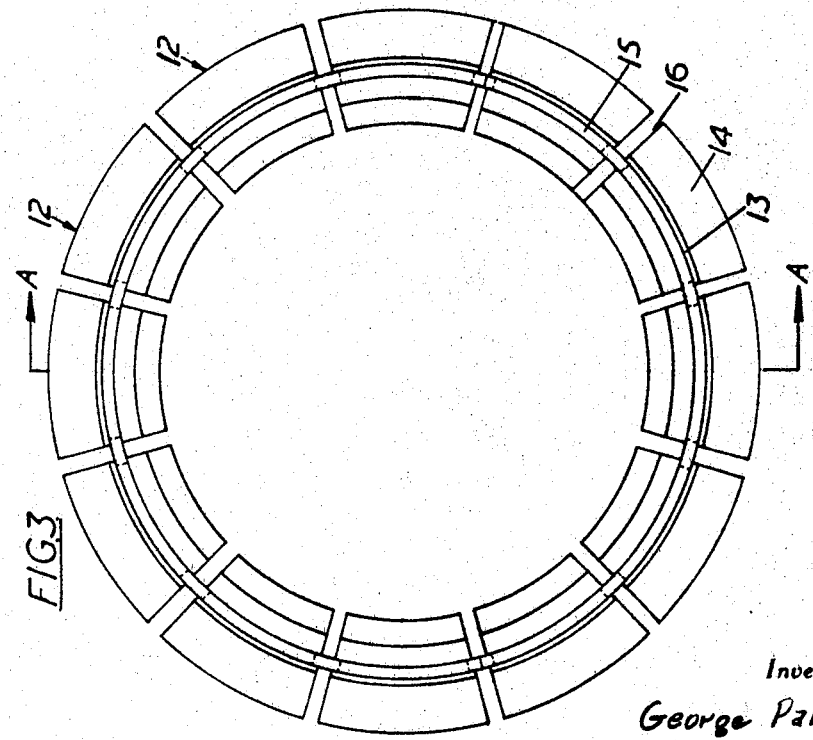

United States Patent Office 3,466,920
Patented Sept. 16, 1969

3,466,920
EXPANDING TOOL FOR USE WITH A
TUBULAR WORKPIECE
George Parker, Glasgow, Scotland, assignor to Stewarts
and Lloyds Limited, Glasgow, Scotland
Filed May 18, 1967, Ser. No. 639,548
Int. Cl. B21d 41/02; B21b 25/00
U.S. Cl. 72—393                                    4 Claims

ABSTRACT OF THE DISCLOSURE

An expanding tool for use with a tubular metal workpiece has a piston and cylinder for moving a uniformly-tapered plug relative to uniformly expansible collet member formed in one piece, which collet member has protruding abutment means on its periphery thereby aligning the collet with the axis of the tube.

---

The present invention relates to expanding tools for use with tubular metal workpieces, and to methods of shaping the ends of tubular metal workpieces.

According to the present invention, an expanding tool has a uniformly-tapered plug and a piston and cylinder for moving the plug to expand a uniformly expansible collet or the like against the inner surface of one end of a tubular metal workpiece.

Further features of the invention will be evident from the following description, which is given by way of example, of an embodiment thereof with reference to the accompanying drawing, in which:

FIG. 1 is a longitudinal section through apparatus according to the invention;

FIG. 2 is a longitudinal section of a collet along the line A—A of FIG. 3; and

FIG. 3 is an elevation looking in the direction of the arrows B—B of FIG. 2.

Referring to FIG. 1, an expanding tool for uniformly increasing the internal cross-sectional area and/or improving the uniformity of the inner periphery of an end of a tubular metal workpiece 10 includes a uniformly-tapered mild steel plug member 11 adapted to engage in a part of the bore of a uniformly-expansible spring steel collet 12 formed in one piece (see FIGS. 2 and 3). The collet 12 has a neck 13 which is a snug fit in the end of the workpiece, a lip 14 on one side of the neck 13 which projects beyond and abuts on the workpiece, and section 15 on the lip remote side of the neck 13, which section is of lesser diameter than the neck 13. A plurality of peripherally equi-spaced slots 16 having enlarged rounded ends 17 extend from the lip 14 substantially the whole length of the collet parallel to its longitudinal axis. The bore of the collet has a taper 18 from the lip 14 towards section 15 corresponding exactly to the taper 19 of the plug member 11.

The plug member 11 is moved by an axial force applied to it by a cylinder and piston assembly, consisting of a cylinder 20 and piston 21. A piston rod 22 projects from one face of the piston and an extension rod 23 projects from its opposite face, the free end 24 of the extension rod being secured in an axial hole 25 in the plug member 11.

The cylinder 20 is closed by means of end plates 26 and 27. The plate 26 is fixed to the cylinder body by means of screws 28 and has an axial hole 29 in which the piston rod 22 is a sliding fit and through which it may project. A small neck 30 on the inner face of the plate 26 around the hole 29 provides a seating for a spring 31 which is mounted about the piston rod 22 and is seated at its other end about a neck 32 on the piston-rod-projecting face of the piston. The plate 27 is welded at 33 to the cylinder and is provided with an axial hole 34 in which the extension rod is a sliding fit and through which it projects. The external face of the plate 27 is recessed at 35 to provide a seating for a fluid seal 36 which is maintained in position by a flanged annulus 37 mounted flush with the face of the plate 27 by means of screws 38.

The cylinder 20 has a fluid inlet and outlet port 39 opening into a chamber 40, which chamber is sealed from the rest of the cylinder by a fluid seal 41 seated in a recess in the extension rod-projecting face of the piston 21. The seal is maintained in position by a second annulus 42 which is mounted on said face of the piston by means of screws 43. The inner face of the plate 27 has an elongated neck 44 which abuts the annulus 42 ensuring that the port 39 opens always into the chamber 40 and is never blocked by the piston 21.

In operation, the collet 12 and the plug member 11 are introduced into the end of the workpiece 10 requiring expansion. FIG. 1 shows the collet and plug member in position at the beginning of the operation. The end 24 of the extension rod is secured in the hole 25 in the plug member 11 and the external face of the plate 27 is brought into abutment with the lip 14 of the collet. Fluid is then introduced through the port 39 into the chamber 40 pushing the piston towards the plate 26 to compress the spring 31. As the piston moves the extension rod also moves forcing the plug member along the bore of the collet in the direction of taper of the collet. In this way the diameter of the end of the workpiece may be uniformly increased.

The plug member 11 may be disengaged from the collet by evacuating the fluid from the chamber 40. Under the action of the spring 31 the extension rod 23 pushes the plug member along the bore of the collet and out of engagement with the said collet. The spring steel collet then contracts to is original size thus allowing the whole unit to be removed from the workpiece.

The hydraulic power unit can be a hand operated unit either integral with or separate from the cylinder. The unit could also be a piece of static plant powered from a hydraulic main service.

While the invention is concerned primarily with the butt-jointing of pipe lengths, it is to be understood that it is applicable to the expansion of pipe ends in general.

I claim:
1. An expanding tool for radially expanding the end of a tube, comprising:
   a plug member,
   means defining wedge surfaces on said plug member,
   a radially expansible collet member formed in one piece and adapted to extend around said plug member,
   radially outwardly protruding abutment means on the periphery of said collet member for abutting against the end of said tube and thereby locating said collet member in the tube in alignment with the axis of the tube,
   means defining inclined surfaces on said collet member for co-operation with said wedging surfaces on said plug member, and
   piston and cylinder means for displacing said plug member relative to said expansible collet, whereby said wedging surfaces slide on said inclined surfaces to radially expand said collet member against the inner surface of the tube,
2. An expanding tool as set forth in claim 1, and further comprising means defining a plurality of longitudinal slots in said collet member extending less than the full length of said collet member and permitting the radial expansion of said collet member.
3. An expanding tool as set forth in claim 1, and further comprising a transverse abutment surface on said piston and cylinder means for seating one end of said collet member.

4. An expanding tool as set forth in claim 1, wherein said piston and cylinder means comprise a cylinder having two openings at opposite ends thereof and a piston having a first piston rod extending through a first one of said openings to said plug member, and a second piston rod extending through the other one of said openings.

References Cited

UNITED STATES PATENTS 3,314,276   4/1967   Peyton et al. _____ 72—393

RONALD D. GREFE, Primary Examiner

U.S. Cl. X.R.

72—465